June 29, 1948.  G. M. WALTON  2,444,147
LIQUID FILTER ELEMENT
Filed March 15, 1945
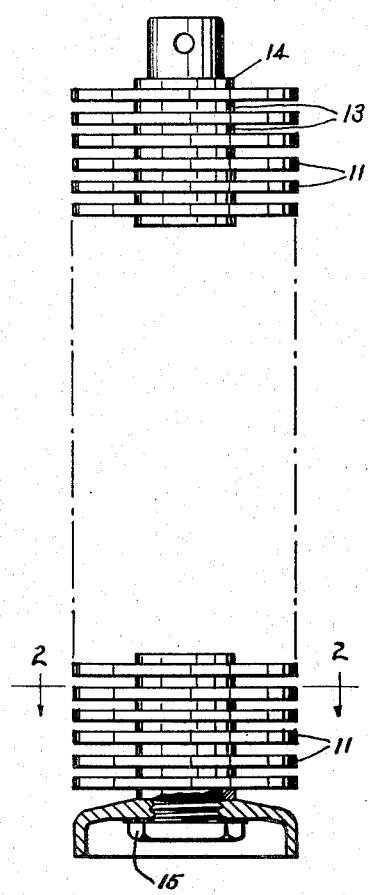
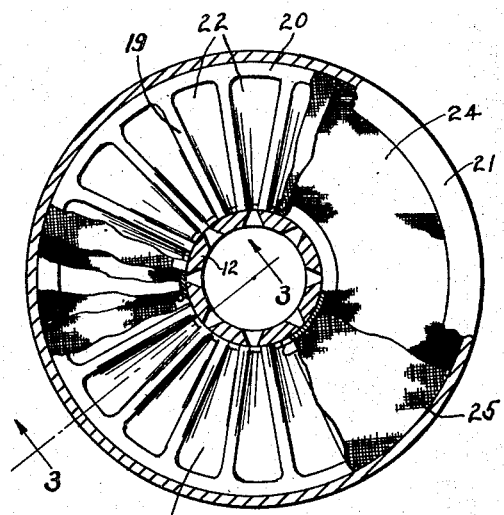
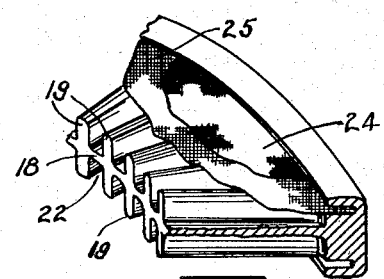
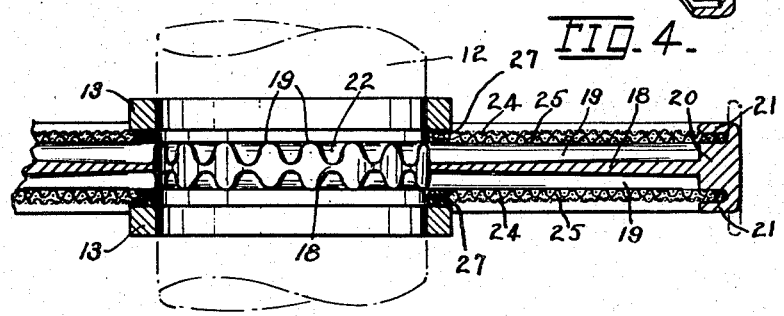
INVENTOR.
GEORGE M. WALTON.
BY Hyde and Meyer
ATTORNEYS.

Patented June 29, 1948

2,444,147

UNITED STATES PATENT OFFICE 2,444,147

LIQUID FILTER ELEMENT

George M. Walton, Shaker Heights, Ohio, assignor to Air-Maze Corporation, Cleveland, Ohio, a corporation of Delaware Application March 15, 1945, Serial No. 582,922

1 Claim. (Cl. 210—169)

This invention relates to improvement in hollow-leaf filtering elements and to a manner of assembling the same.

The present invention particularly relates to improvements in a filtering element for use in a filter of the type shown in my copending application Serial Number 483,911, filed April 21, 1943, now abandoned, although it will be understood that the construction of filter elements disclosed herein may be used in any filtering device regardless of the type of housing used.

Briefly, the structure disclosed in my aforesaid copending application comprises, in part, a plurality of hollow leaf filter elements assembled in a spaced series upon the outer wall of a hollow tube, each of said elements consisting of a discoidal unit having exterior surfaces covered with filtering material, and having hollow interior portions in communication with said tube. The fluid to be filtered enters a housing containing the element assembly, proceeds through the filtering material and into the tube interior, whence it may be recirculated to the location of its use.

One of the objects of the present invention is to provide a novel and improved filter element unit adapted for use in a filter assembly of the type indicated, and provided with novel means for spacing or separating the outer filtering surfaces of the element unit, while affording adequate passageways through the interior of the unit for liquid flow to the tube interior.

Another object of the invention is to provide a filter element unit of the nature described, and wherein the separator element hereinabove mentioned comprises a disk provided with a central aperture and having a deformable annular flange projecting from each of the opposed edge faces of the disk periphery, said disk further having a spaced series of radial ribs extending outwardly on both faces thereof, and terminating short of the position of said flanges, said flanges being capable of being inturned to grasp and retain the peripheral edges of the aforesaid filtering elements carried upon said ribs.

A further object of the invention is to provide a filter element unit and separator element as specified in the last preceding paragraph, and wherein each face of said disk is further provided, around the outer ends of said ribs, with an annular shoulder, the edge of the filtering element being gripped between said shoulder and said flange.

Other objects and advantages will be apparent from the following description in conjunction with the accompanying drawings illustrating one embodiment of the invention.

In the drawings,

Fig. 1 shows a plurality of my improved filtering elements in assembled relationship for use in a filter of the type shown in my copending application above referred to;

Fig. 2 is an enlarged view of one of the elements taken along the line 2—2 of Fig. 1 with parts broken away to more clearly show the construction;

Fig. 3 is a sectional view taken along the line 3—3 of Fig. 2 and somewhat enlarged and distorted as to the thickness of materials used for the purpose of clearly illustrating the construction; and Fig. 4 is a perspective view of a fragmentary portion of a single hollow leaf filter element.

While the manner of assembly of a plurality of the filter elements of the present invention is generally similar to that illustrated and described in my copending application, Serial No. 483,911, filed April 21, 1943, each element in the present instance has been modified in certain structural essentials to achieve the objects and advantages hereinabove set forth.

In the present device a plurality of filter elements 11 are shown in assembled relationship upon a tube 12, there being any number of elements necessary to provide the filtering area required in a particular case, and permitted by the space available. An annular spacer member 13 is inserted between each adjoining pair of elements, and the assembly is maintained in any convenient way, for example by the fixed collar 14 on one end of the tube 12, and the adjustable clamping nut 15 on the other end. It will be understood that the filter assembly just described is enclosed in a housing (not shown) having liquid inlet and outlet ports, and that the liquid enters the housing under pressure, passes through the filtering surfaces of the elements, enters the tube 12 through apertures communicating with the respective element interiors, and leaves the housing through the outlet port which is in communication with the tube.

The construction of a single filter element unit will now be described with particular reference to Figs. 2, 3 and 4.

Each element in the embodiment shown includes a centrally located separator element consisting of a disk 18 provided with a centrally located aperture adapted to receive tube 12 therein. The disk 18 has on each of its two opposed faces a spaced series of radially directed ribs 19 extending outwardly from the central aperture, and terminating somewhat short of the outer peripheral edge of the disk. Said outer peripheral edge has rigid therewith, and projecting from its top and bottom edge faces, a pair of shoulders 20, 20. Along the outer edge of said shoulders I provide upper and lower annular flanges 21, 21 which are inwardly deformable from the dotted line to the full line position of Fig. 3 for a purpose soon to appear. In the preferred embodiment ribs 19 extend to and connect with shoulders 20 and consequently the upper and lower faces of disk 18 are provided with radial passages 22 which serve to convey filtered liquid towards the central aperture.

The separator element just described is interposed between a pair of annular, foraminate, filtering members 24, which in the embodiment illustrated are formed from relatively fine mesh material suitable for the particular application. If the weave is so fragile that the external liquid pressure tends to collapse the material into the passages 22, a relatively coarse mesh member 25 may be placed underneath each filtering element 24 to afford a support without blocking liquid flow. This relatively coarse member also permits flow of the filtrate transversely across the upper and lower surfaces of ribs 19 after it has passed through the fine mesh element 24.

All elements just described including the separator 18, the coarse mesh support 24, and the fine mesh filtering element 25 are tightly bound together at their superposed peripheral edges by turning flange 21 inwardly from the dotted line position of Fig. 4 to the full line position so that the elements 24 and 25 are gripped between the flange 21 and the shoulder 20. Preferably, but not necessarily, the inner edges of the screens 24 and 25 are bound to prevent loose pieces of wire being carried to the tube interior with the filtrate. To this end I have provided grommets 27, each binding one of the screens 24 and one of the screens 25 around their inner peripheries.

The separator member herein disclosed may be fabricated from any suitable metal, for example one of the light metals or alloys. Its contour is such that it may be made either by sand casting, gravity die casting, or pressure die casting, or by any of the familiar metal working processes such as pressing or forging. If cast or pressed from a suitable synthetic plastic material of thermoplastic character, the deformation of flange 21 can be effected at a proper elevated temperature. If formed from a thermosetting plastic, the assembly and flange deformation must be effected prior to the final curing operation.

The particular filter element arrangement herein shown is especially adapted for use in a lubricating oil recirculatory system, but may obviously be used in the filtration of any liquid, the mesh size of the filtering screen element being chosen in accordance with particular requirements.

What I claim is:

A hollow leaf filtering element comprising an annular separator member having an outer peripheral shoulder, there being a central aperture through said member, a web centrally located between the faces of said shoulder and extending inwardly to said central aperture, two series of ribs integral with said web, one series on each face of said web, all of said ribs extending radially of said separator member from said shoulder to said central aperture, the spaces between said ribs being open at said central aperture, said ribs being of the same height as said shoulder, an annular filter member on each side of said separator member and substantially coextensive therewith, said filter members having central apertures registering with said central aperture of said separator member, a flat binding ring about the inner peripheral edge of each of said filter members, and means securing the outer peripheral edge of each of said filter members to the adjacent face of said shoulder in sealed relation therewith.

GEORGE M. WALTON.

REFERENCES CITED

The following references are of record in the file of this patent:

UNITED STATES PATENTS

| Number | Name | Date |
|---|---|---|
| 1,686,092 | Manning | Oct. 2, 1928 |
| 1,726,035 | Loew | Aug. 27, 1929 |
| 1,940,208 | Dieman | Dec. 19, 1933 |
| 2,088,199 | Gleason | July 27, 1937 |

FOREIGN PATENTS

| Number | Country | Date |
|---|---|---|
| 324,696 | France | Dec. 19, 1902 |
| 403,107 | France | Sept. 16, 1909 |